Feb. 14, 1967 L. W. CARIGNAN 3,303,551
PIPE UNION PROCESSING MACHINE
Filed May 13, 1965 7 Sheets-Sheet 1

INVENTOR.
LUCIEN W. CARIGNAN
BY
Barlow & Barlow
ATTORNEYS

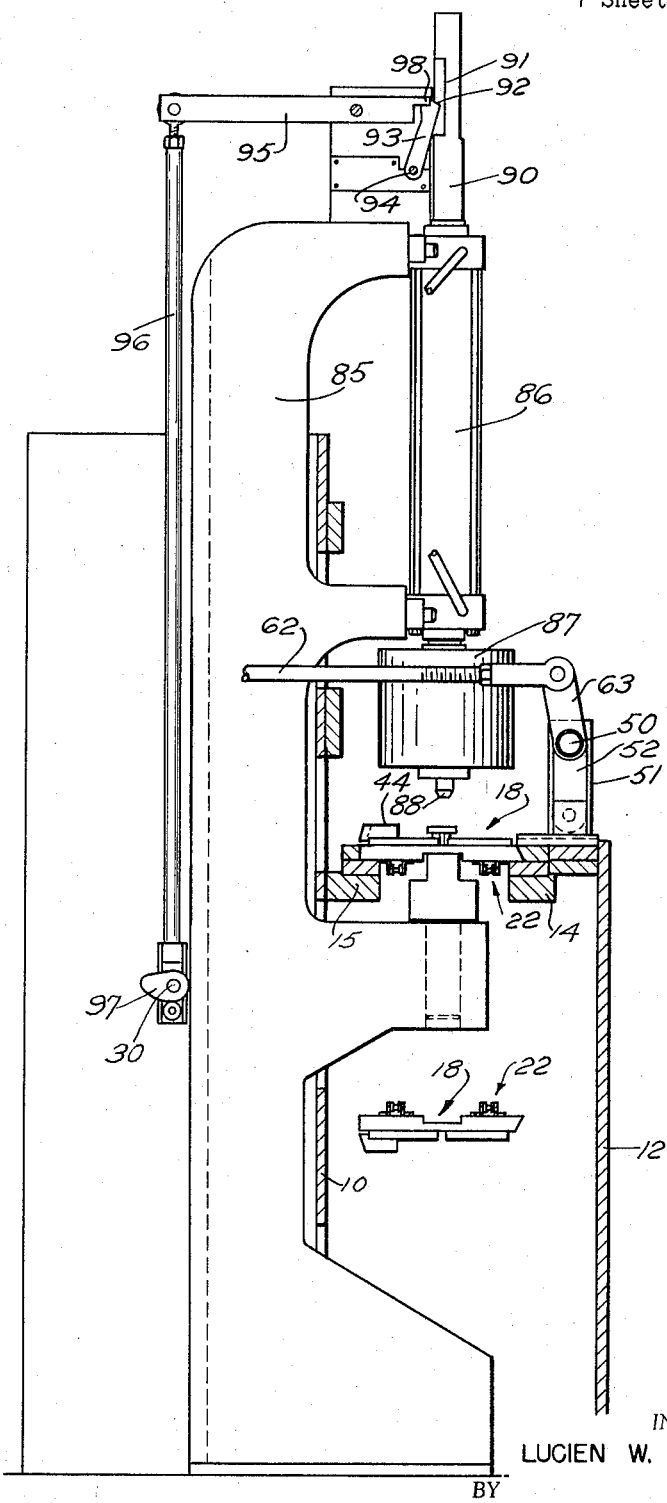

INVENTOR.
LUCIEN W. CARIGNAN
BY
*Barlow & Barlow*
ATTORNEYS

Feb. 14, 1967   L. W. CARIGNAN   3,303,551
PIPE UNION PROCESSING MACHINE
Filed May 13, 1965   7 Sheets-Sheet 7
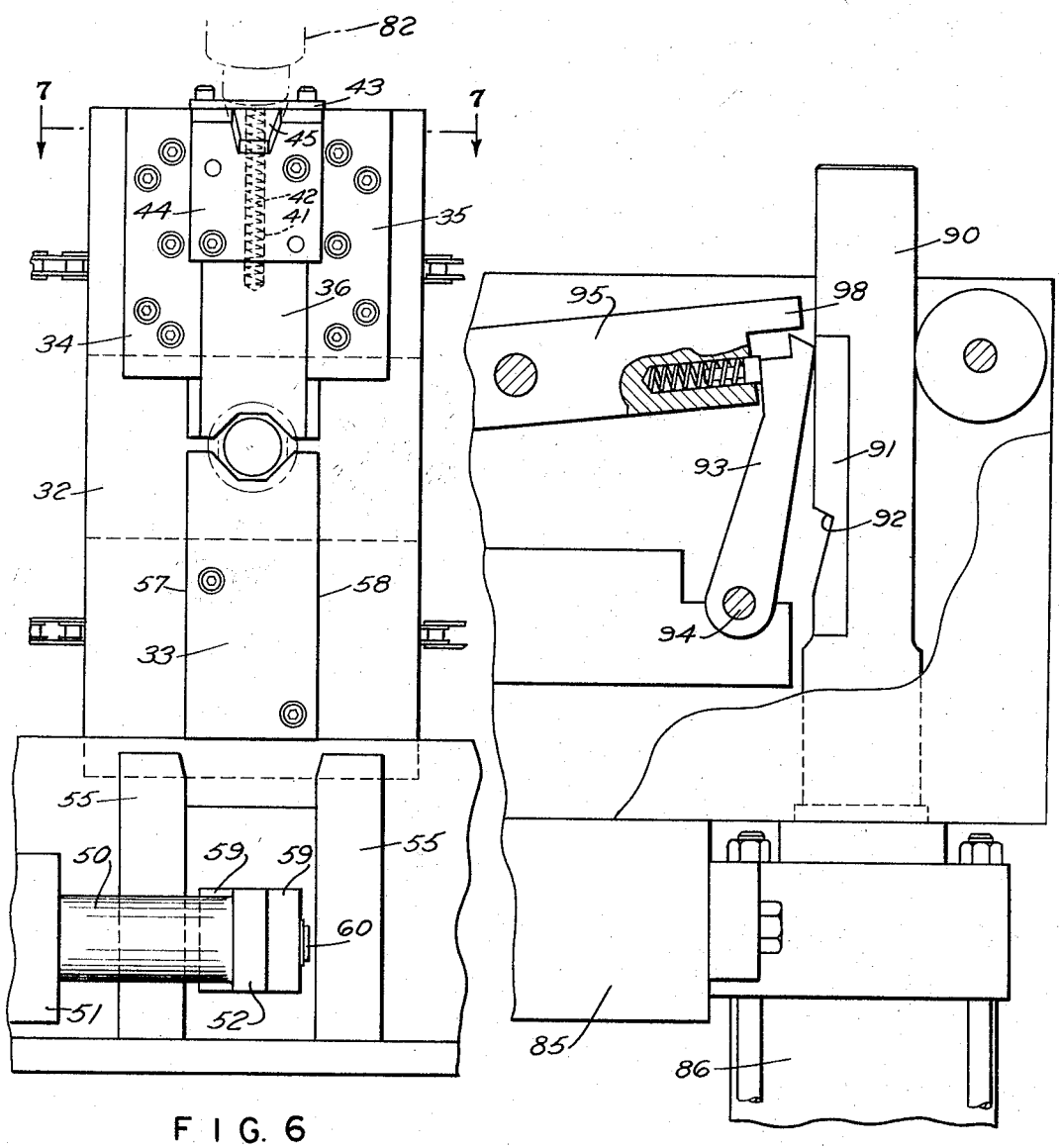
FIG. 6
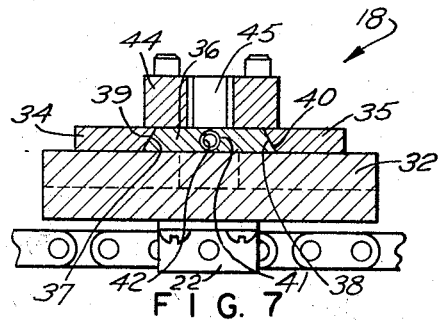
FIG. 7
FIG. 8
INVENTOR.
LUCIEN W. CARIGNAN
BY
*Barlow & Barlow*
ATTORNEYS

United States Patent Office 3,303,551
Patented Feb. 14, 1967

3,303,551
PIPE UNION PROCESSING MACHINE
Lucien W. Carignan, East Providence, R.I., assignor to New England Malleable Iron Company, a corporation of Rhode Island
Filed May 13, 1965, Ser. No. 455,575
7 Claims. (Cl. 29—33)

This invention relates to a machine which is designed to perform a number of sequential operations on an article of manufacture generally known in the trade as a pipe union.

It has been the practice in the pipe fitting industry to perform separate machining operations on a pipe union at individual manually loaded stations which would be capable of performing only one operation at a time. Such a production line arrangement requires that the item be transported from one station to the next and that at each station chucking of the part to perform the additional operation becomes necessary. As can be readily realized by those skilled in the art, when the item being machined is a foundry product, there is some lack of uniformity in the product, and thus when multiple chucking of the product is necessary, it will be apparent that various machining operations will never occur about the same center of the casting. It is accordingly the main object of the invention to provide a machine which in one chucking will advance the product from station to station where individual machining and pressing operations may be performed thereon.

It is a further object of the invention to provide for continuous production of components by advancing the same on a conveyor to which a plurality of chucks are attached with means being provided at each station for tightening the chuck before the actual machining operation begins.

A further object of the invention is to provide simultaneous machining of different areas of a single part at a number of stations along a conveyor having a single carrier chuck for each part attached thereto.

A still further object of the invention is to provide a machine with various mechanical operating stations and conveyorized transfer and synchronization of movement of identical parts, each in its own chuck, between stations.

With these and other objects in view, the invention consists of certain novel features of construction as will be more fully described and particularly pointed out in the appended claims.

In the accompanying drawings:

FIG. 3 is an elevational view partly in section with some elements removed for clarity showing the second operative station;

FIG. 6 is a plan view of the chuck at the righthand end of the shaft in FIG. 1;

FIG. 7 is a sectional view taken on line 7—7 of FIG. 6; and

FIG. 8 is an elevational view on an enlarged scale showing the latching means of the ram of FIG. 3.

Figure 1:
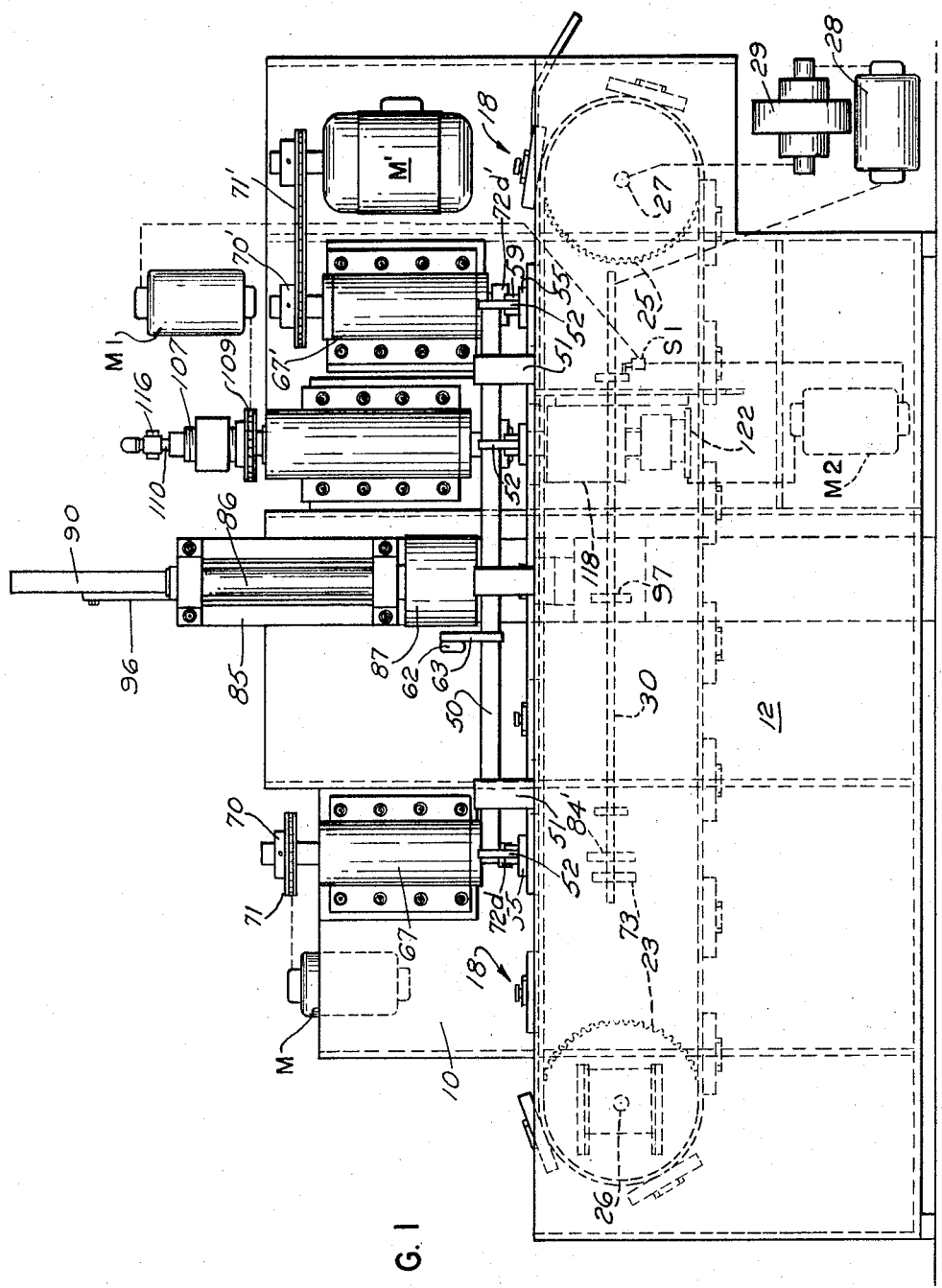
FIG. 1 is a front elevational view of the machine of my invention.

The machine comprises a main vertical upright 10, and spaced from this upright by suitable frame supports, which have been eliminated from the drawing for clarity, is a front vertical member 12 which extends to a lesser height.

Figure 2:
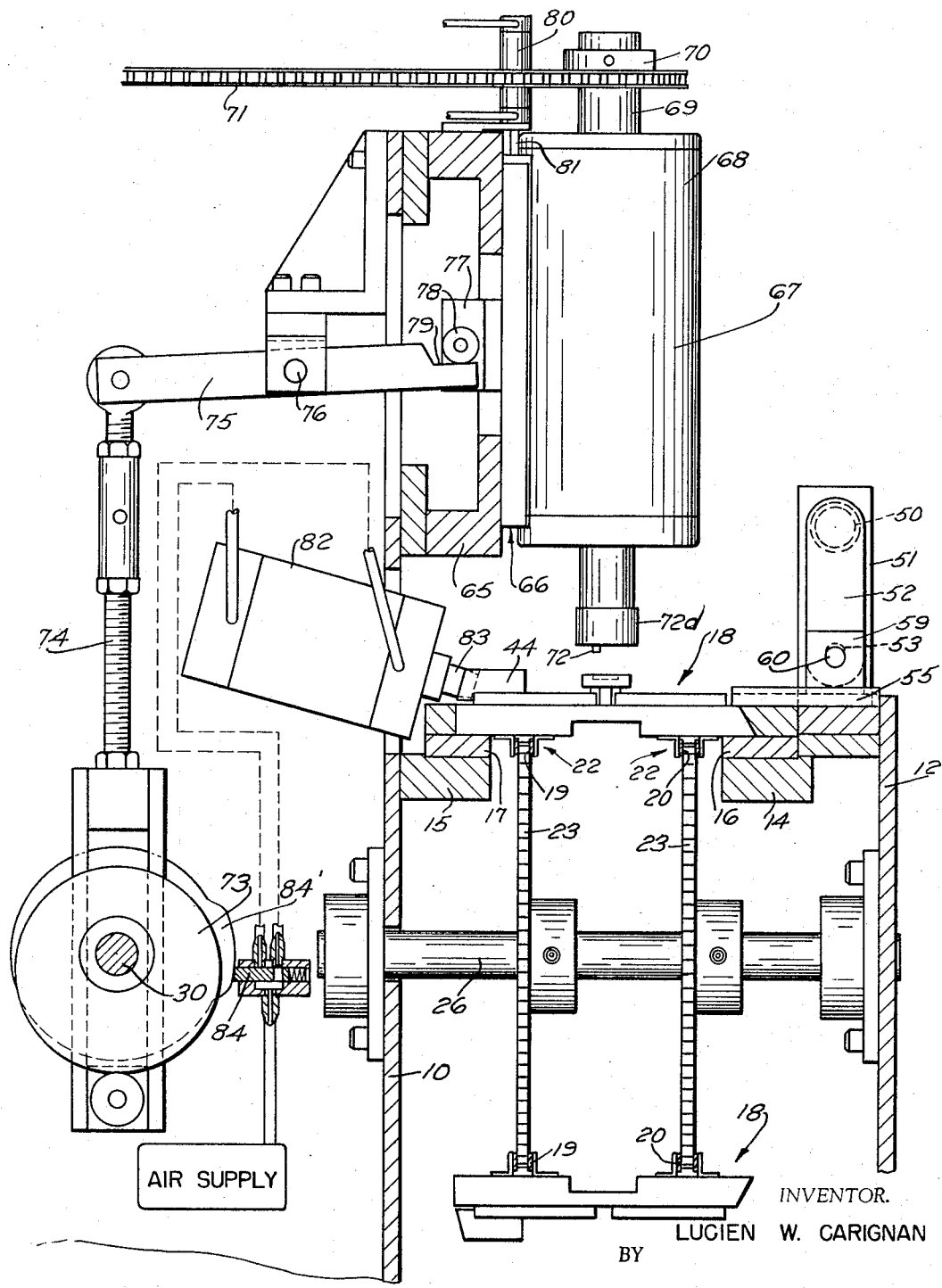
FIG. 2 is an elevational view partly in section showing the first operative station.

Adjacent the upper end of the vertical upright 12 a horizontal bed is provided by means of longitudinal stringers 14 and 15 on top of which are received longitudinal ways 16 and 17 (see FIG. 2). The longitudinal ways 16 and 17 provide support for a number of chucks generally designated 18 which chucks are fastened to a continuous pair of parallel chains 19 and 20 by means of fastening devices generally designated 22. The chains are mounted between pairs of sprockets 23 and 25 which sprockets are mounted on common shafts, sprockets 23 being mounted on a shaft 26 and sprockets 25 being mounted on a shaft 27. Drive means for the chain is provided through the shaft 27 from a suitable source of power 28, such as an electric motor, the output of which is connected through a Geneva motion 29 and suitable mechanical couplings to the input of shaft 27. The operation of a Geneva motion is well known to those versed in the art but briefly consists of an intermittent motion which is produced by a continuously rotating drive device. Thus, through the use of suitable machine design techniques and gear reductions, the chains and, in turn, the chucks 18 may be made to travel linearly a certain finite distance, the distance in the instant situation being the linear uniform distance between operating stations of the machine of my invention.

Operating from the same source of primary power as the drive means for the chucks 18, and chains 19 and 20 is a longitudinal timing shaft 30 (see FIGS. 2, 3 and 5) which actuates cams at each station that in turn through suitable means initiate the various machining operations and in addition release a drop hammer or a ram, and create vertical travel of spindles which carry various tools.

Referring now to FIGS. 6 and 7 of the drawings, there is illustrated one of the chucks which is carried by the conveyor chains, each of the chucks comprising a base member 32 which has secured thereto a fixed jaw portion 33 and a pair of strips 34, 35 which serve as guide ways for the movable jaw portion 36 of the chuck. Edges of the guide strips 34, 35 are chamfered as at 37, 38 (FIG. 7) and the corresponding edges of the movable jaw 36 are chamfered as at 39, 40 so as to nest therein and slide against the surface of the base member 32. A bore 41 is provided in the end of the movable jaw 36 into which a spring 42 is fitted, the other end of the spring bearing against a plate 43 that is affixed to the base 32 so that normally the portion 36 of the chuck is urged toward the fixed jaw 33. Secured to the top of the movable jaw 36 is a plate 44 which has a notch 45 cut therein, which notch is adapted to receive the plunger end of a ram that forcibly urges the movable jaw 36 toward the fixed jaw 33 at each of the operating stations as will more fully appear.

Extending longitudinally of the frame of the machine and just above the longitudinal horizontal bed is a shaft 50 that is suitably supported from the horizontal bed by upright brackets such as 51. Arms, such as 52, are secured to the shaft 50 at each of the operating stations, each of the arms 52 having an elongated slot 53 at its lower end. A pair of spaced parallel plates 55 are mounted on the horizontal bed for movement toward and away from the area including the conveyor chains and particularly the chucks carried thereby and are spaced apart a distance substantially equal to the distance from the two edges 57, 58 of the fixed jaw 33 (see FIG. 6). An upright bifurcated member 59 is mechanically connected to these two plates 55 and has a pin 60 therethrough which engages the slot 53 of the arm 52. Rotation of the shaft 50 is had by means of an actuating rod 62 (FIG. 3) that is coupled by a lever 63 fixed to the shaft 50. Movement of the rod 62 will rock the shaft 50 and, in turn, rock the arm 52 that will slide the plates 55 to either side of the fixed chuck 33 and engage the edges 57, 58 thereof. In this fashion when each chuck has reached its station, it is clamped in position by the guide plates 55 so as to index the same. As the shaft 50 rocks, a ram 83 is actuated to engage chuck part 36 by means of a fluid operated piston in the cylinder 82 which is controlled by a valve 84 in a fluid supply line which valve is moved by cam 84 on shaft 30. After the machining operation is completed, the actuating rod 62 and the ram are both moved in the opposite direction, out of position, to permit chucks to advance to the next station. Timing of the actuation of the rod 62 and the ram is controlled by the main drive after the conveyor drive is stopped, so that once the Geneva motion above referred to reaches its dwell portion, locking of the chucks in position will be had by actuation of the rod 62 and the ram 83 which is in timed relation to the operation of the Geneva motion at its dwell portion.

In sequence, immediately after the chucks are locked in position by movement of the arm 62, the cams which are mounted on the timing shaft 30 will come into play and will actuate each of the machining operations. Referring specifically to FIG. 2 of the drawings, which is the first machining operation, there is shown therein mounted on the upright 10 a mounting block 65 which carries a set of ways generally designated 66 that, in turn, mount for reciprocation a spindle assembly 67. The spindle assembly 67 is of the usual construction and consists merely of a housing 68 that journally receives a shaft 69. The upper end of this shaft is fitted with a drive sprocket 70 to which a drive chain 71 or other suitable drive means is connected from the motor M, while the lower end of the spindle 69 carries a tool holder 72d with a tool 72. When the cam 73 that is mounted on the shaft 30 reaches a high portion thereof, it will begin to reciprocate the coupling arm 74 and, in turn, rock the lever arm 75 which is pivoted to the main upright 10 as at 76 and which is loosely coupled to the spindle assembly 67. The coupling that is illustrated in the drawing consists of a rearwardly extending bracket 77 that has a roller 78 thereon which rests on a shelf 79 at the terminal end of the arm 75. An air cylinder 80, spring means or the like mounted on the bracket 65 urges through a plunger 81 the spindle 67 in a downward direction. Thus, when the lever 75 rocks and permits downward motion of the spindle assembly 67, it will not only move under its own weight but also under urgence of the air cylinder or spring means 80. In this fashion the spindle 67 will move downwardly and perform the necessary machining operation by means of the tool 72 and since the timing shaft 30 is continuously rotating, it will be apparent that after the dwell of the cam 73 has passed, the spindle will be moved upwardly by means of the rocking motion of lever 75.

It should be mentioned at this point that the machining operation is carried out when two previous conditions have been met which have been briefly referred to above. The first of these is that the slides 55 will have engaged the chuck to position the same in proper orientation to the spindle 67, further that a ram 82 carrying a plunger end 83 has engaged the slot 45 on the movable jaw of the chuck. In this way the work is firmly gripped by the chuck and the chuck is properly oriented relative to the spindle, operation of the ram 82 taking place, of course, at approximately the same time that the shaft 50 rocks, locating the chuck in position. It should also be mentioned that as the spindle moves downwardly, a drive means M through the chain 71 is actuated, thus rotating the spindle at the proper speed for the machining operation that is to take place. This drive means M is a separate motor which runs continuously. It will further be apparent that as the spindle 67 moves downwardly, the drive means consisting of the chain 71 will also move downwardly. However, sufficient length of chain 71 or an equivalent V belt and flexibility of the drive means is provided so that misalignment for a short period of time will not hamper the operation of the spindle 67 and its machining tool 72.

Referring to FIG. 1 of the drawings, it will be noted that a space has been left between the machining operating spindle 67 and the next adjacent operation which is shown in FIG. 3 of the drawings. This space in the instant embodiment is for the placing of a ring insert within the groove cut by the tool 72, and the apparatus for accomplishing this has been left out of the disclosure for clarity's sake, it being understood from a broad standpoint that ring inserts may be manually placed in the groove cut by the tool 72. After the piece being worked on has advanced from the blank space in FIG. 1, following the first operating station, it passes on to the pressing station that is illustrated in more detail in FIG. 3. Here a vertical standard 85 supports at its upper and lower ends a double acting piston 86. This double acting piston has fitted at the lower end a weighted portion 87 that carries a tool 88 which is adapted to engage the work and in the instant embodiment to press the ring, that has been referred to, tightly into the groove cut by the tool 72. It will be noted that a piston rod 90 extends from the upper end of the double acting piston 86 which rod has a rearwardly facing notch therein. As is known by those skilled in the art, the double acting piston will be forced downwardly by fluid such as air being let into one end thereof and will move upwardly when air is fed to the lower end thereof. To effect the action of forcing the ring into the groove cut by the tool 72, a hardened insert 91 (see FIG. 8) is placed in the upper end of the shaft 90 and this insert carries a feed notch therein 92 which mates with the toggle 93 that is pivoted to part of the frame as at 94. Action of the toggle 93 is provided by means of a lever arm 95 which in turn is actuated through a rod 96 that extends downwardly to a cam 97 carried by the shaft 30. As the cam travels to permit downward movement of the rod 96, the end 98 of the lever 95 moves upwardly, thus freeing the toggle 93 to move counterclockwise as viewed in the drawing along the inclined surface 92, and in this fashion the pressure loading on the upper end of the double acting cylinder 86 will permit fast downward motion of the tool 88 which will strike the inserted ring and force the same into the groove cut into the work. Return motion is provided by fluid means supplied to the lower end of piston 86 whereupon the toggle is free to enter in notch 92, the end 98 resting on the shelf thereof.

Figure 4A:
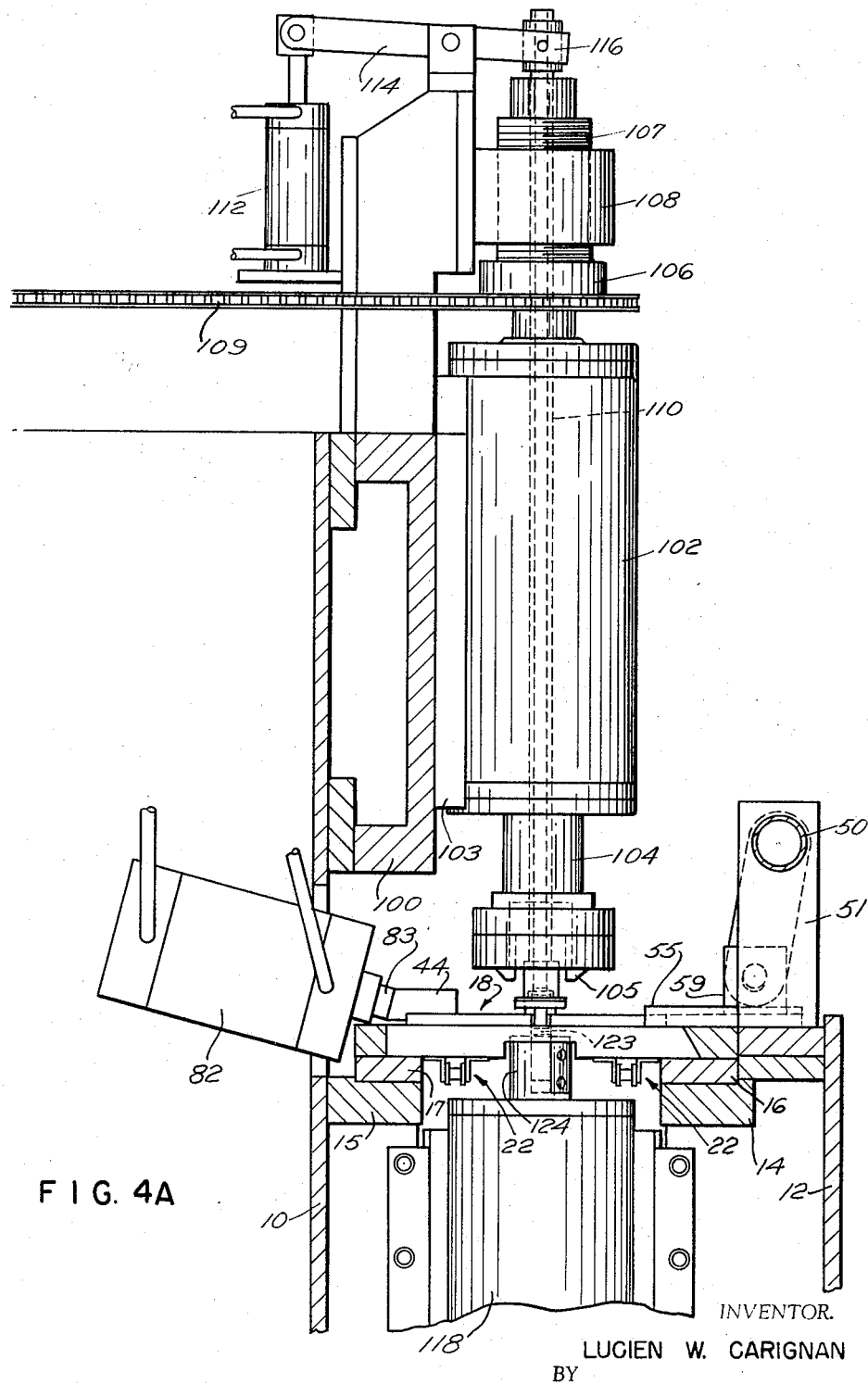
FIGS. 4A and 4B are elevational views partly in section showing the upper and lower portions of the third station of operation.
Figure 4B:
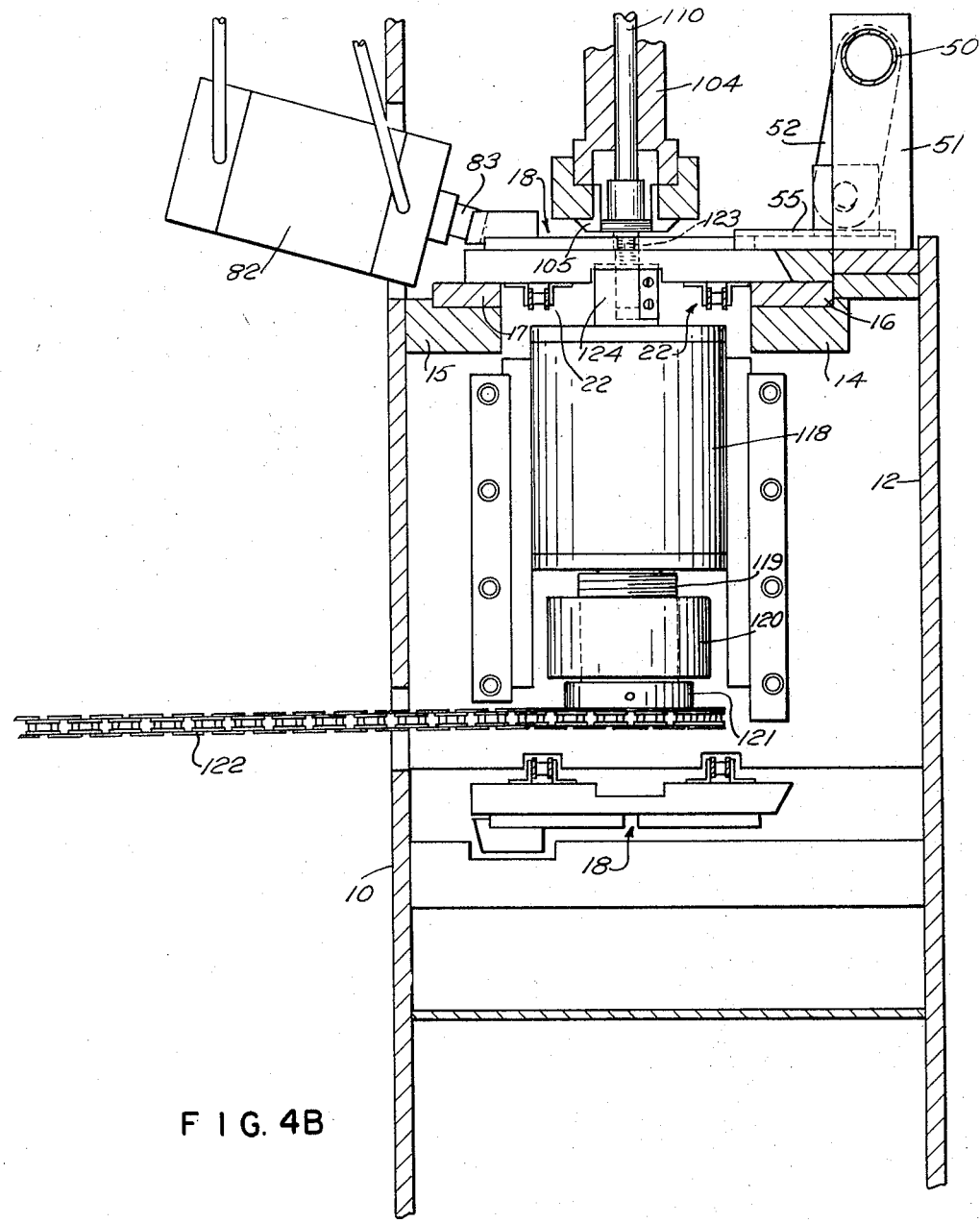

Referring now to FIGS. 4A and 4B, a station for providing an internal thread and an external thread at the same time is shown. Referring first to FIG. 4A, it will be seen that on a bracket 100 that is affixed to the standard 10 a spindle 102 is slidably mounted in ways 103. The spindle is provided with a thru shaft 104 which at the lower end carries an external threading tool 105, while at the upper end thereof it carries a drive sprocket 106 and a threaded post 107. Engaging the threaded post 107 is a collar 108 that is affixed to the support means for the spindle so that upon rotation of the shaft 104 through the drive means consisting of a motor M1 and a belt or chain 109 downward motion thereof will be had, which motion will be suitably timed with actuation of the other machine operations that take place with the machine of this invention. The shaft 104 through the spindle 102 is hollow, and a pipe 110 extends through this bore in the shaft 104, which pipe terminates at its lower end in a position substantially at the terminus of the threading cutters 105. The pipe 110 has an end large enough to prevent entry into the bore of the union fitting that has been cast therein (see FIG. 4B) and moves independently of the spindle by means of a double acting piston motor 112 which acts through a lever 114 that is coupled at one end to the piston motor 112 and at the other end is bifurcated around the end of the pipe 110 as at 116. This motor 112 operates just immediately ahead of the time that the spindle moves downwardly so as to provide downward pressure against the work with respect to the internal threading tool, to be described. As an additional feature, the pipe may be used to conduct cutting lubricant to the work and thus may serve a dual function.

As alluded to above, an internal threading is formed at the same time as the external threading, the mechanism for this being shown in FIG. 4B and being substantially a mirror image of FIG. 4A. Briefly, the internal tap mechanism comprises a spindle 118 having a shaft therethrough with a threaded means 119 at the lower free end thereof, which means is received in a collar 120 that is affixed to the machine base. The shaft carries a sprocket 121 which receives a drive means 122 such as a belt or chain or the like from motor M2, and in this case the upper end of the shaft carries a tap 123 through a suitable tool holder means 124. Up and down motion of the spindle is achieved by rotation of the shaft and the threaded engagement with collar 120, the timing of this motion being controlled by the main drive and substantially simultaneous with the upper spindle 102 by means of an electric switch S1 controlled from shaft 30 for controlling both motors M1 and M2.

Figure 5:
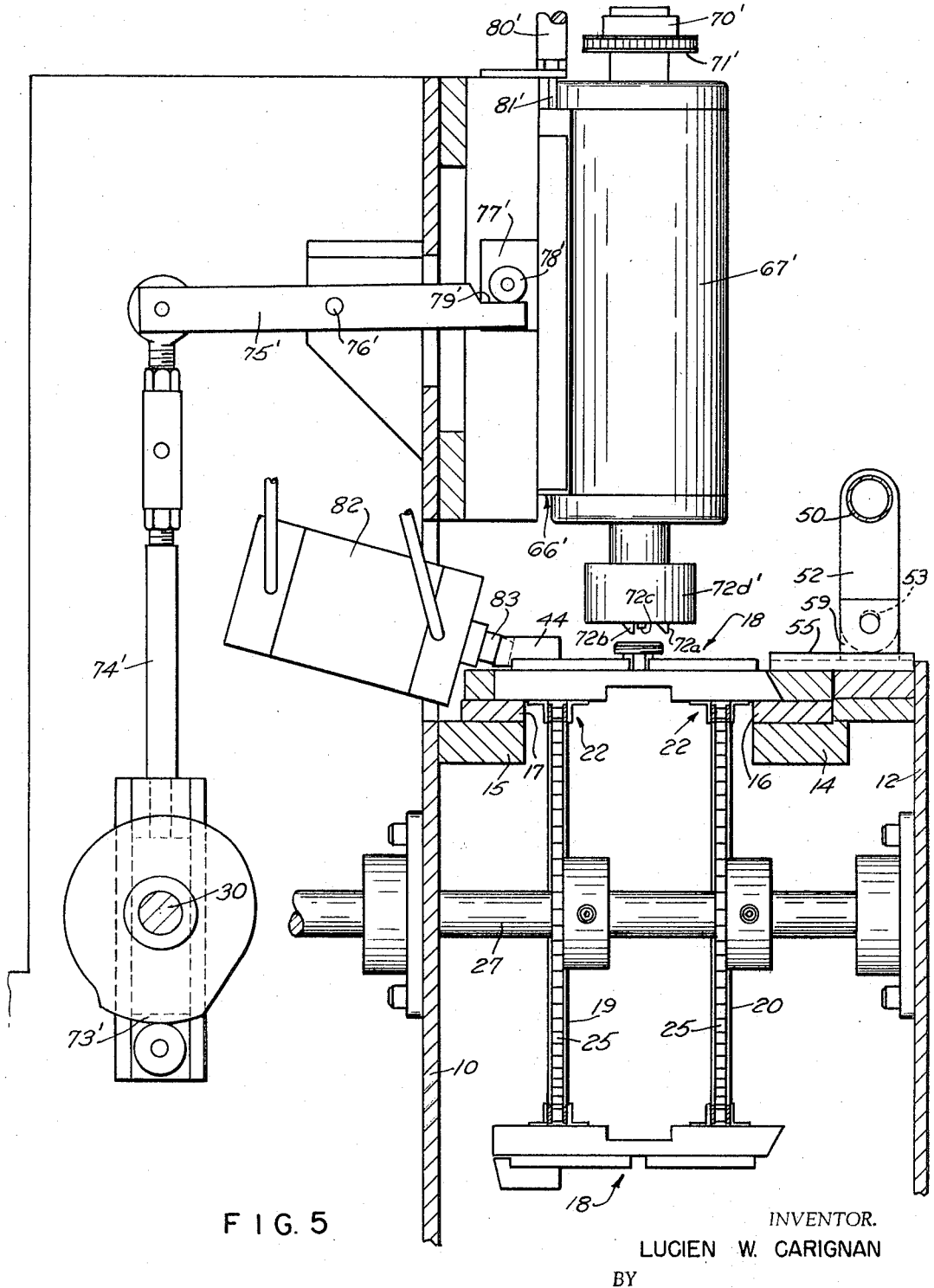
FIG. 5 is an elevational view partly in section showing the fourth station of operation.

The last machining operation is illustrated in FIG. 5 of the drawings which from a mechanical standpoint is identical to the apparatus shown in connection with FIG. 2. Accordingly, like reference numerals with a prime have been utilized. Briefly, the apparatus of FIG. 5 has a cutting tool 72$^a$ which is placed in the tool holder 72$d'$ and is adapted to chamfer the outer upper end portion of the union while a cutting tool 72$^b$ is placed in the tool holder 72$d'$ to chamfer the inner upper end at the same time. The spindle 67' is again urged in a downward direction by an air piston 80' and is permitted to travel downwardly through the rod and lever mechanism 74' and 75' that is under actuation of cam 73'. Chuck holding means are present at this station as well as the locating devices to position the chuck with respect to the spindle.

Referring to FIG. 1, it will be appreciated that unions or other articles to be worked on may be placed in the machine at the left of the drawing either manually or by mechanical means. They will move on through travel of the conveyor chain from station to station, the operations at each station being in timed sequence and being synchronized with motion or lack of motion of the conveyor chains and more particularly of the chucks carrying the work.

I claim:

1. A machine for sequentially processing a work piece comprising a continuous conveyor chain, chucks mounted at intervals on said chain, each chuck comprising relatively movable opposed jaws, a plurality of spindles mounted over said chain, said spindles being located at spaced intervals, the intervals of said chucks and the intervals of said spindles being one a multiple of the other, drive means, a timing shaft driven by said drive means, intermittent motion means coupled between said drive means and said conveyor chain, clutch operating means moving said jaws to grip the work while the conveyor chain is at rest, means on said timing shaft to actuate each of said spindles when said conveyor chain is at rest, whereby a machining operation coupled to said spindle may work on material held by said chucks while at rest.

2. A machine as in claim 1 wherein where is a chuck operating means adjacent each spindle location.

3. A machine as in claim 1 wherein each chuck comprises a fixed jaw and a slidable jaw and the chuck operating means comprises a pin driven against the movable jaw of said chuck.

4. A machine as in claim 1 wherein adjacent a spindle location a chuck aligning means is provided to locate the chuck with reference to its direction of travel whereby the chuck will be positively located in position relative to said spindle.

5. A machine as in claim 1 wherein adjacent each spindle location a chuck aligning means is provided to locate the chuck with reference to its direction of travel whereby each chuck will be positively located in position relative to each spindle.

6. A machine for sequentially processing pipe unions or the like comprising a continuous conveyor chain, means for intermittently moving said chain, chucks mounted at intervals on said chain, a plurality of spaced operating stations along said conveyor chain, a member at an operating station mounted to move laterally of the path of travel of the chuck to engage a chuck at an operating station to align such chuck with reference to such station, timing means coupled to said drive means, said timing means initiating operations at each station while the chain is at rest.

7. A machine for sequentially processing pipe unions or the like comprising a continuous conveyor chain, means for intermittently moving said chain, chucks mounted at intervals on said chain, a plurality of spaced operating stations along said conveyor chain, a member at each operating station mounted to move laterally of the path of travel of the chucks to engage each chuck at each operating station to align such chuck with reference to such station, timing means coupled to said drive means, said timing means initiating operations at each station while the chain is at rest.

References Cited by the Examiner

UNITED STATES PATENTS

| 2,063,955 | 12/1936 | Schlitz | 29—33.12 |
| 2,212,402 | 8/1940 | Rieser | 29—33.12 |

RICHARD H. EANES, JR., *Primary Examiner.*